US005085094A

United States Patent [19]

Clawson et al.

[11] Patent Number: 5,085,094

[45] Date of Patent: Feb. 4, 1992

[54] DOOR OPERATOR COUPLING ASSEMBLY

[75] Inventors: Charles W. Clawson, Alliance; James W. Stottsberry, Massillon, both of Ohio

[73] Assignee: GMI Holdings, Inc., Alliance, Ohio

[21] Appl. No.: 610,523

[22] Filed: Nov. 8, 1990

[51] Int. Cl.$^5$ ........................ F16H 25/20; E05F 11/00; B23Q 3/00

[52] U.S. Cl. ........................................ 74/424.6; 29/466; 49/199; 49/362; 74/89.15; 160/188; 403/341

[58] Field of Search .......................... 49/199, 360, 362; 160/188; 74/424.7, 458, 89.15, 424.8 R, 424.6; 403/339, 340, 393; 29/464, 466, 467

[56] References Cited

U.S. PATENT DOCUMENTS

| | | | |
|---|---|---|---|
| 2,056,174 | 10/1936 | Earhuff et al. | 49/362 |
| 3,290,849 | 12/1966 | Wright | 52/592 |
| 3,439,727 | 4/1969 | Perl | 49/360 |
| 3,444,650 | 5/1969 | Flinchbaugh | 49/360 |
| 4,241,540 | 12/1980 | Depperman | 49/362 X |
| 4,352,585 | 10/1982 | Spalding | 49/199 X |
| 4,649,016 | 3/1987 | Hardin, Jr. | 74/89.15 X |

*Primary Examiner*—Allan D. Herrmann
*Attorney, Agent, or Firm*—Pearne, Gordon, McCoy & Granger

[57] ABSTRACT

A screw and guide rail coupling assembly is for a garage door operator. The garage door operator has a motor-driven rotatable screw at least partially within a nonrotatable guide rail and a slide guided by the guide rail and movable longitudinally therealong by engagement with the screw and connectable to open and close the garage door. The screw is in at least first and second screw parts, and a screw coupling is adapted to interconnect adjacent ends of the first and second screw parts. The guide rail is in at least first and second guide parts, and a guide coupling adapted to interconnect adjacent ends of the first and second guide parts. The screw coupling is longitudinally spaced or offset from the guide coupling wherein the screw coupling is completely contained and supported within one of said first and second guide parts. The offset provides a significant increase in the maximum torque of the screw and guide rail coupling assembly.

16 Claims, 5 Drawing Sheets

DOOR OPERATOR COUPLING ASSEMBLY

BACKGROUND OF THE INVENTION

1. Field of the Invention

This invention relates to automatic door operators having a drive screw within a guide means, and more particularly to a coupling assembly for the drive screw and the guide means.

2. Description of the Prior Art

Garage door operators have been manufactured and sold for over 40 years. The concept of a longitudinally stationary but rotating screw to act on a traveling nut to open an overhead-type garage door was shown to have been conceived over 45 years ago in U.S. Pat. No. 2,056,174. Cable-operated or chain-operated garage door operators have also been proposed, for example, as shown by U.S. Pat. Nos. 3,439,727 and 3,444,650. Typically, garage door operators provide a traverse of the door operator mechanism of about eight or nine feet in order to accommodate the usual height of the garage door plus the 90° angle through which the door turns.

In the chain-type garage door operator that has been manufactured, it has been customary for many years to shorten the package in which the door operator is shipped by cutting the guide channel into two or three parts which may by spliced together. The channel which was previously nine feet long could comprise three parts of about three feet in length each. The screw drive door operators which were marketed at that time retained a one-piece screw and a one-piece guide means of about nine feet in length, which made the package costs higher and, more importantly, made the shipping and storage costs higher because the shipping charges are usually based upon the cubic volume of the package rather than upon the weight.

Screw drive garage door operators have now been developed in which the guide means is in two or three parts and the screw is in two or three parts. Initially, the screw and the guide means were interconnected by coupling means which had an interconnecting link with a pivot pin at each end pivoted to the screw parts. In one early version of such an operator, the guide means and screw parts were folded for shipment and then, upon installation, were straightened to be coaxial, and splice plates were bolted onto the sides of the guide means to maintain the coaxial alignment of the screw parts. An example of this type of coupling assembly is shown in U.S. Pat. No. 4,241,540, issued to Depperman.

Some of the problems with this construction were the weakness of the screw coupling relative to the rest of the screw, the alignment of the guide means when it was properly straightened, and the whipping of the screw during rotation which, because of two different pivot points, acted somewhat like a universal joint to whip around inside the guide means. The coupling for the two screw parts also had so many different parts that the possible cumulative error in the tolerance of all these manufactured parts made it possible that the threads on the two screw parts could be mismatched relative to the transversing partial nut, and thus the nut would fail to traverse this elongated coupling. Also, the very many parts in this coupling and the necessary clearance between the parts to premit folding caused the coupling to tend to destroy itself upon repeated reversals of the screw.

Many of these problems were overcome by the screw coupling disclosed in U.S. Pat. No. 4,352,585, issued to Spalding, Instead of being connected together at the factory by a double pivot connection, the screw parts were shipped to the customer in a disconnected condition, but one in which the coupling could be readily connected in a proper phase to avoid mismatch of the threads. A suitable coupling was also provided for the guide means, but the screw coupling and the guide means coupling were located longitudinally at approximately the same location along the length of the door operator. Since the screw coupling was the weakest part of the screw and the guide means coupling was the weakest part of the guide means, these weak portions were located together, creating an inherent weakness at the coupling point. In addition, there was always the possibility of misalignment of either the guide means or the screw, and since the coupling for the screw and for the guide means were located longitudinally together, both the screw and the guide means could be misaligned at the coupling, resulting in damage to the door operator, or even causing the door operator to be inoperative if the misalignment was server enough.

SUMMARY OF THE INVENTION

The present invention provides an improved screw and guide means coupling assembly which overcomes the disadvantages and shortcomings of the prior art.

Instead of locating the screw coupling and the guide means coupling at the same longitudinal position along the door operator, the present invention provides for offsetting the screw coupling and the guide means coupling so that they do not occur in the same longitudinal location. This eliminates the inherent weakness in the door operator assembly resulting from the combined effects of having the screw coupling and the guide means coupling in the same position. It also provides for aligning support for the screw and for the guide means so that misalignments are reduced and controlled.

In accordance with the present invention, the screw coupling and the guide means coupling are longitudinally offset, so that one of the guide means parts provide added support and alignment around the screw at the position of the screw coupling and one of the screw parts provides support and alignment inside the guide means at the location of the guide means coupling.

The screw and guide means coupling assembly of the present invention has been shown to provide a significant increase in the ultimate yield torque of the door operator assembly. When the screw coupling is offset longitudinally by a distance of 6 inches from the location of the guide means coupling, the ultimate yield torque can be increased as much as 16%. This increase in torque strength is believed to occur because the guide means surrounds the screw coupling and provides support and alignment to the screw parts on each side of the screw coupling, so that the screw parts are maintained on the center line. By coaxially maintaining the screw parts, there is less tendency for the screw parts to try to uncouple themselves. In the prior art door operator, the screw parts were allowed greater movement because they were positioned at the location of the guide means coupling. The screw parts were thus allowed to "float" off the center line and, under high torque loads, the screw parts tended to uncouple themselves, resulting in failure. This effect is avoided by the present invention.

While the present invention results in a significant increase in ultimate yield torque, the accompanying increase in the ultimate tensile strength of the coupling is insignificant. The expected result of increasing tensile strength is not achieved by the present invention. However, the torque strength is increased even through tensile strength is not, achieving an unexpected result.

These and other advantages are achieved by the present invention of a screw and guide means coupling assembly for a garage door operator. The garage door operator has a motor-driven rotatable screw at least partially within nonrotatable guide means and a means guided by the guide means and movable longitudinally therealong by engagement with the screw and connectable to open and close the garage door. The screw is in at least first and second screw parts, and a screw coupling is adapted to interconnect adjacent ends of the first and second screw parts. The guide means is in at least first and second guide parts, and a guide coupling is adapted to interconnect adjacent ends of the first and second guide parts. The screw coupling is longitudinally spaced from the guide coupling wherein the screw coupling is completely contained and supported within one of said first and second guide parts.

In accordance with another aspect of the present invention, a method is presented for assembling a garage door operator. The garage door operator has a motor-driven screw at least partially within guide means, the screw being in at least first and second screw parts, the guide means being in at least first and second guide parts, the first screw part located within the first guide part to form a first partial assembly, and the second screw part located within the second guide part to form a second partial assembly. The method comprises the steps of positioning the second partial assembly in general coaxial alignment with the first partial assembly, interconnecting adjacent ends of the first and second screw parts using a screw coupling, sliding the screw coupling a substantial distance into the second guide part so that the screw coupling is completely contained within the second guide part, and interconnecting adjacent ends of the first and second guide parts using a guide coupling. In addition, the second partial assembly may be positioned in general coaxial alignment with the first partial assembly using one or more support jigs to elevate the second partial assembly and to hold the partial assemblies in an aligned position. The support jig may be part of the packing material for the motor which is used after unpacking the motor and the partial assemblies.

DETAILED DESCRIPTION OF THE PREFERRED EMBODIMENT

Figure 1:
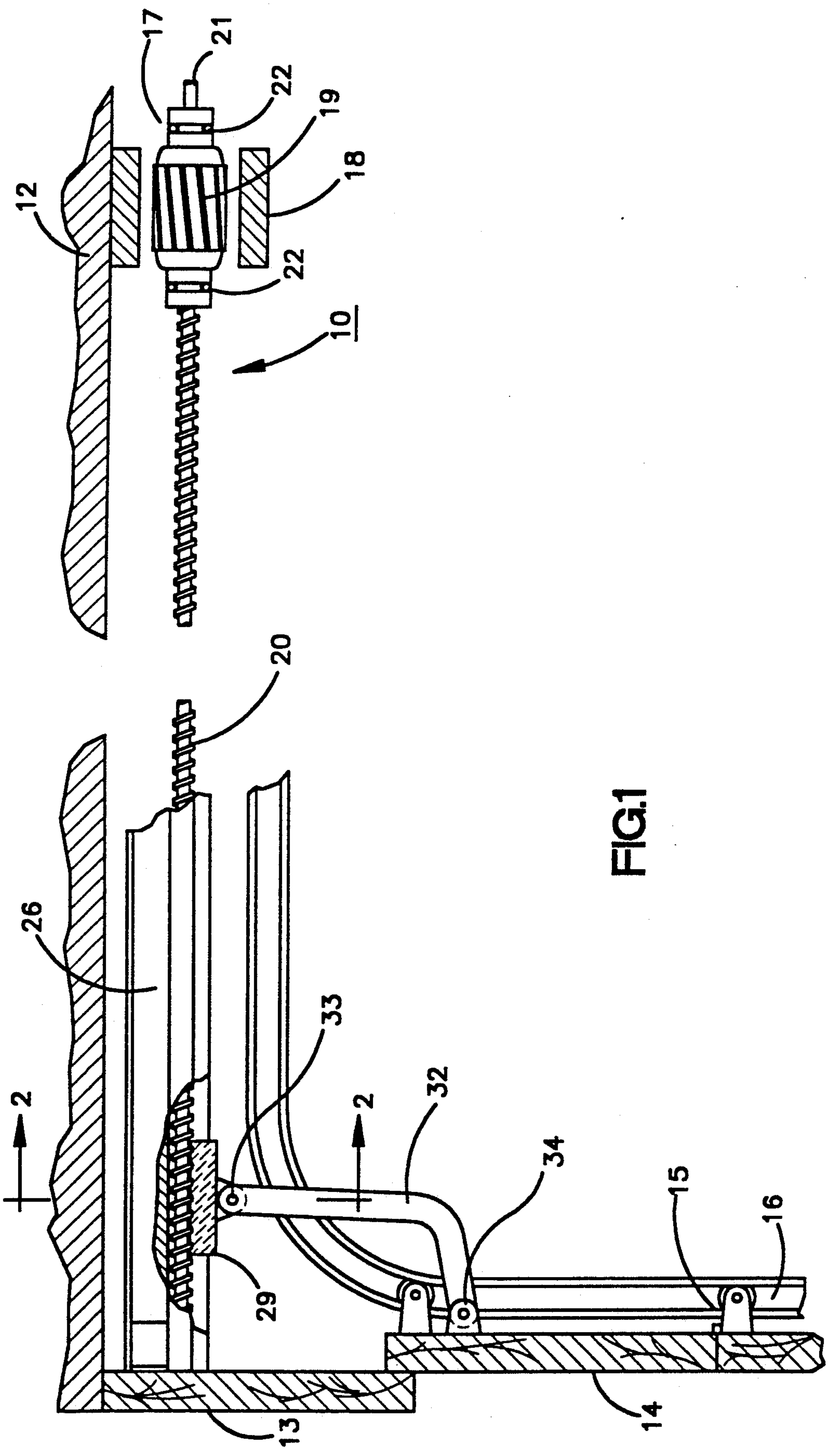
FIG. 1 is a side elevational view, partly schematic, illustrating the invention.

Referring more particularly to the drawings and initially to FIG. 1, there is shown a garage door operator 10 which incorporates the screw and guide rail coupling assembly 11 of the present invention. The garage door operator 10 is intended to be installed within a garage having a ceiling 12 and a door header 13. The operator 10 may open and close almost any type of closure device, including slab doors, which can be pivoted or operate on a form of as track. However, a sectional door 14 is illustrated which has sections hinged together and provided with rollers 15 to roll on a track 16 between the closed position shown and an open position near the ceiling 12. The door operator 10 includes a motor 17 having a stator 18 and a rotor 19, shown rather schematically in FIG. 1. The motor 17 is connected to drive a screw 20. The motor 17 has a shaft 21 connected to rotate the screw 20, and this shaft 21 has bearings, including thrust bearings 22, to absorb the longitudinal thrust in both directions on the screw 20.

Figure 2:
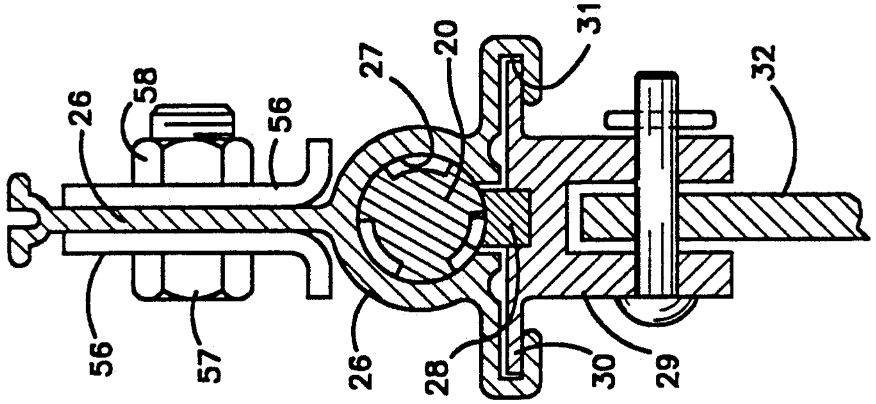
FIG. 2 is an enlarged end sectional view taken along line 2—2 of FIG. 1.

As shown in FIG. 2, the drive screw 20 is mounted at least partially within guide means comprising a guide rail 26. The guide rail 26 has a generally cylindrical borre 27, and the outer diameter of the drive screw 20 is only slightly smaller than the inner diameter of the cylindrical bore 27, so that the screw fits closely within the guide rail. The cylindrical bore 27 circumscribes about 300° of the screw 20. In the remaining 60° of the screw periphery of the screw 20, a partial nut 28 is disposed. The guide rail 26 provides guide means not only for the screw 20, but also for the partial nut 28. A slide 29 has wings 30 slidably disposed in grooves 31 in the guide rail 26, and this slide 29 carries the partial nut 28. A door arm 32 is pivotally connected at a connection point 33 to the slide 29, and at a connection point 34 to the door 14. Accordingly, as the motor 17 rotates the screw 20 in either a clockwise or counterclockwise direction, the partial nut 28, engaged with the screw 20, transverses the guide rail 26 longitudinally to open or close the garage door 14.

Figure 3:
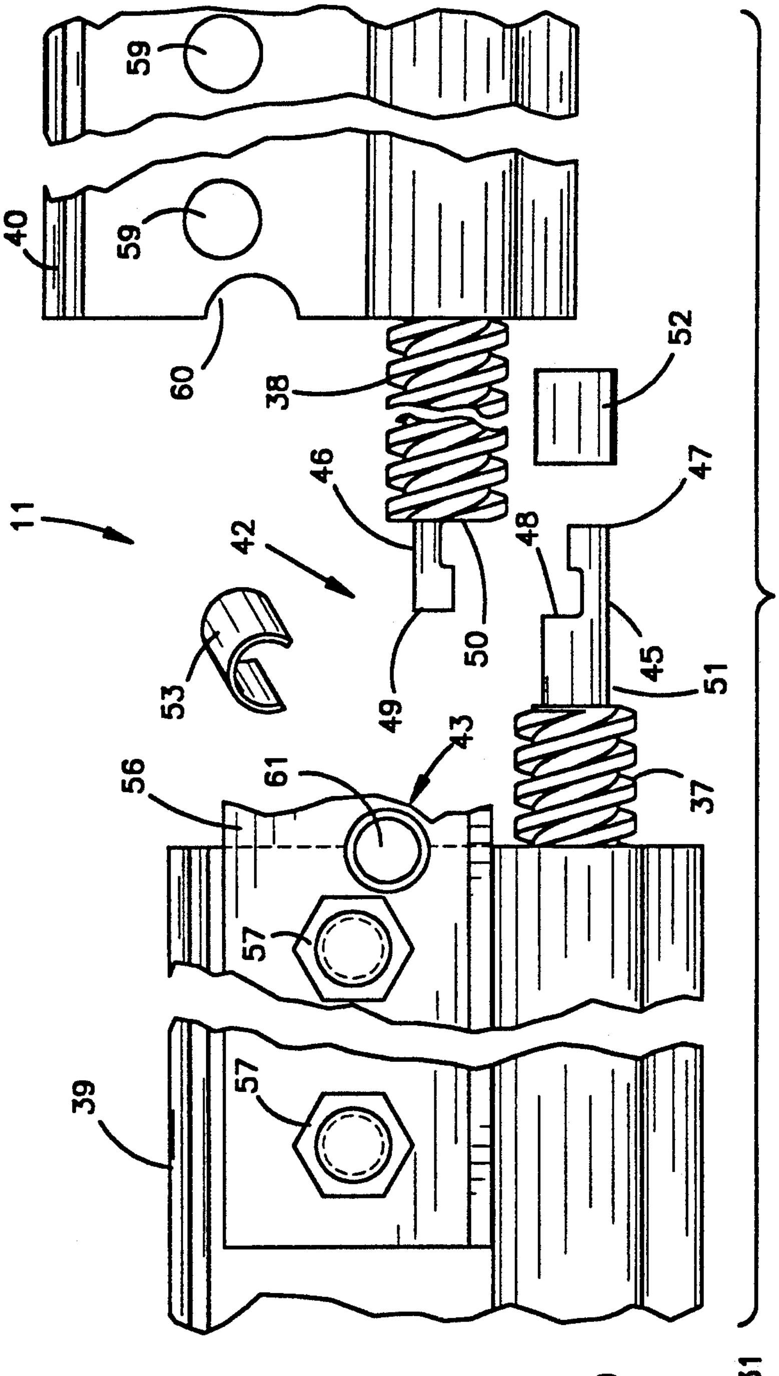
FIG. 3 is an enlarged side elevational view of the door operator coupling assembly of FIG. 1 prior to assembly, to the same scale as FIG. 2.
Figure 4:
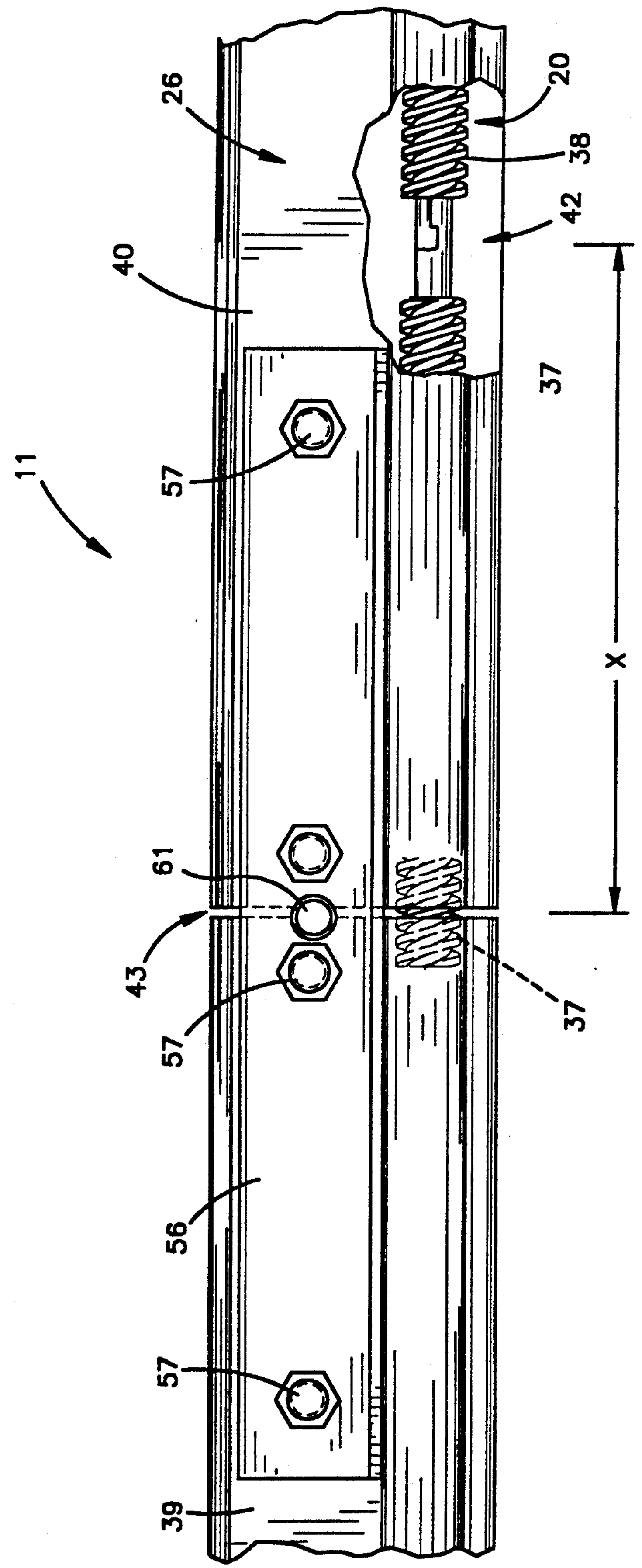
FIG. 4 is a side elevational view of the door operator coupling assembly of FIG. 3 after assembly.

In the garage door operator 10, the screw 20 is formed in at least two screw parts 37 and 38, and the guide rail 26 is formed in at least two guide rail parts 39 and 40. It has been found that a drive screw 20 formed in three parts with a guide rail formed in three parts is preferred. However, for the sake of clarity only two screw parts 37 and 38 and two guide rail parts 39 and 40 are illustrated in FIGS. 3 and 4. By forming the screw 20 and the guide rail 26 in sectional parts, the overall length of the package in which the door operator is shipped is reduced. Since the shipping costs are based primarily on the cubic volume rather than the weight, the length of the package can be reduced to approximately half if the screw and guide rail are in two parts, or can be reduced to approximately one-third if the screw and guide rail are in three parts. This reduction in package length not only saves shipping charges, but also saves storage charges, because door operators can be packed, shipped and stored in a much smaller volume of space. The reduction in space is of benefit to the distributor as well as the dealer. It is also of benefit to the ultimate customer because a package of nine to ten feet in length could not be brought home in the trunk of an automobile by an ordinary purchaser. If the length is reduced to 3½ or 5 feet, however, such transport by the ultimate user is greatly facilitated.

The first and second parts 37 and 38, respectively, of the drive screw 20 and the first and second parts 39 and 40, respectively, of the guide rail 26 are connected together by the coupling assembly 11 shown in more detail in FIGS. 3 and 4. The coupling assembly 11 comprises a screw coupling 42 and a guide rail coupling 43.

The screw coupling 42 is fully described in U.S. Pat. No. 4,352,585, the disclosure of which is incorporated by reference herein. As shown in FIG. 3, the first and second screw coupling parts 45 and 46 are hermaphroditic parts wherein the first part 45 has a male shoulder 47 and a female groove 48, and the second coupling part 46 has a male shoulder 49 and a female groove 50. The screw coupling parts 45 and 46, when interengaged, form a reduced diameter portion of the screw 20. The male shoulder 47 is extended from a reduced diameter portion 51 of the first screw part 37. The portion 51 is reduced in diameter in order to accommodate the inside diameter of a sleeve 52 and also to accommodate the inside diameter of a C-clip 53. The partial nut 28 has a length sufficient to bridge across the length of the screw coupling 42, which is formed of the first and second screw coupling parts 45 and 46, respectively. The screw coupling 42 has approximately the same external diameter as the screw 20 to permit the screw coupling to fit within the guide rail 26 and to permit the partial nut 28 to be in continuous engagement with the screw.

As shown in FIGS. 3 and 4, the guide rail coupling 43 connects the two parts 39 and 40 of the guide rail 26 which are aligned after the screw coupling 42 is interconnected. The guide rail coupling 43 includes splice plates 56, only one of which is shown in FIGS. 3 and 4, one on each side of the guide rail 26 as shown in FIG. 2, and fastened with bolts 57 extending through apertures 59 which engage corresponding nuts 58 to secure together the two parts of the guide rail in alignment. Preferably, each part 39 and 40 of the guide rail 26 has a small semicircular recess 60 formed at the attachment end thereof. The center of each guide rail coupling 43 has a corresponding circular protrusion 61 extending toward the guide rail 26. The circular protrusion 61 fits within the circular opening formed by the two semicircular recesses 60 to assist in positioning the guide rail coupling 43 on the guide rail 26.

In prior art coupling assemblies, such as that shown in U.S. Pat. No. 4,352,585, the screw coupling and the guide rail coupling were both located in the same position along the length of the door operator. This resulted in an inherent weakness at the position of the coupling assembly. In accordance with the present invention, the screw coupling 42 and the guide rail coupling 43 are longitudinally offset from each other, so that one of the guide rail parts 39 or 40 provides added support and alignment around the screw 20 at the location of the screw coupling 42 and one of the screw parts 37 or 38 provides support and alignment inside the guide rail 26 at the location of the guide rail coupling 43.

Figure 6:
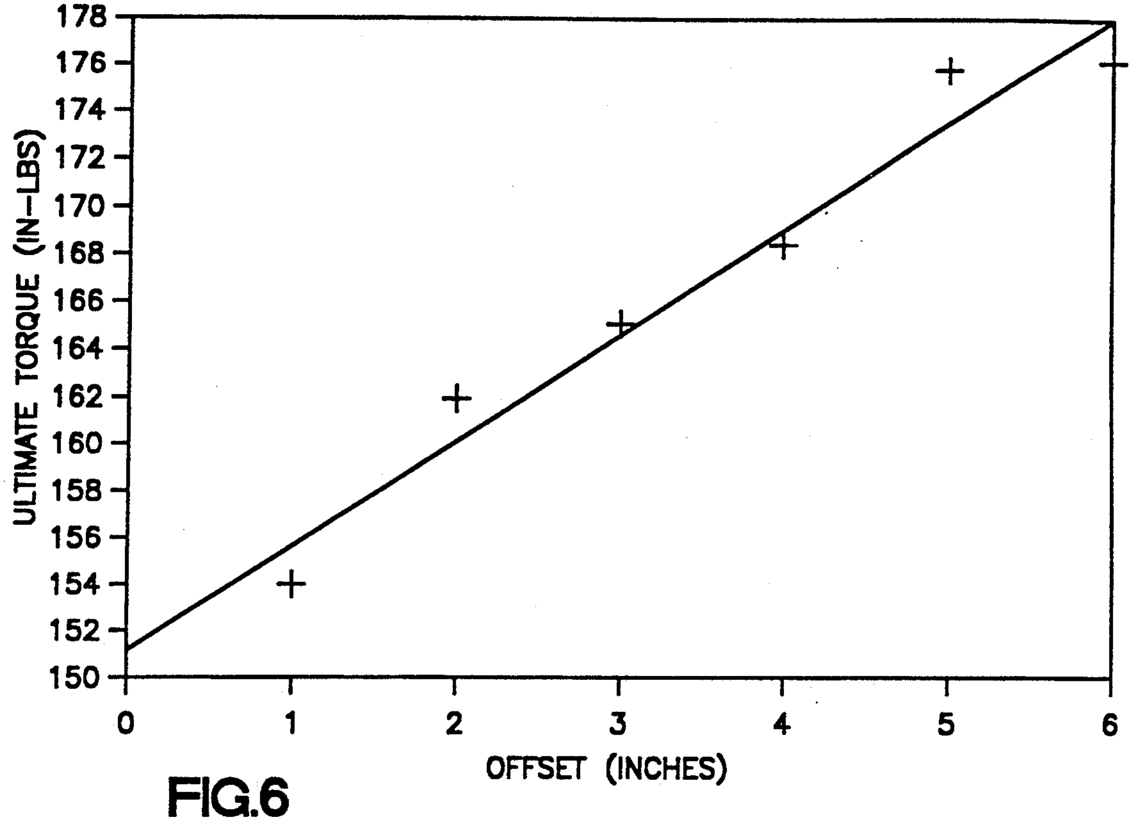
FIG. 6 is a graph showing the increase in ultimate yield torque achieved by the present invention.

As shown more particularly in FIG. 4, the longitudinal position of screw coupling 42 is spaced by a distance of x from the longitudinal position of the guide rail coupling 43. This longitudinal spacing has the effect of strengthening the screw drive assembly and maintaining the drive screw in proper alignment at the location of the screw coupling. This result can be seen with reference to FIG. 6 which shows the results of tests conducted on door operator assemblies according to the present invention in which the longitudinal position of the screw coupling 42 is offset from the longitudinal position of the guide rail coupling 43. In the tests depicted in FIG. 6, five door operator assemblies were tested at each of six offset distances x ranging from 1 inch to 6 inches, a total of 30 door operator assemblies thus being tested. The door operator assemblies were of the common commercial type having screw parts and guide rail parts of about 3 feet in length. The average ultimate yield torque for the five test samples at each offset distance is shown in FIG. 6. The test results indicate that the ultimate torque increased generally linearly (with a correlation of 0.98) and a line showing this linearity is shown in FIG. 6. The test results also indicated that a 6-inch offset produced the maximum increase in yield torque in a door operator of the conventional commercial type. The yield torque increased from approximately 151 inch-pounds at zero offset to approximately 176 inch-pounds at a 6-inch offset, resulting in about a 16% increase in ultimate yield torque. A significant increase in yield torque of 7% was achieved with only a 2-inch offset, so that at least some of the advantage of the present invention can be achieved with an offset of only 2 inches. However, the preferred offset is 6 inches, since this produced the maximum increase in yield torque.

Using door operator assemblies of the common commercial type in which a guide rail part is approximately 3 feet long, a 6-inch offset means that the screw part is about 15% longer than the guide rail, and a 2-inch offset means that the screw part is about 5% longer than the guide rail.

The increase in torque strength is believed to occur because one of the guide rail parts 39 or 40 surrounds the screw coupling 42 and provides support and alignment on each side of the screw coupling, so that the screw parts 37 and 38 are maintained on the center line. By maintaining the screw parts 37 and 38 on the center line, there is less tendency for the screw parts to try to uncouple themselves. In prior art door operators, the screw parts were allowed greater movement because the screw coupling was positioned at the location of the guide rail coupling. The screw parts were thus allowed to "float" away from the center line and, under high torque loads, the screw parts tended to uncouple themselves, resulting in failure. This effect is avoided by the present invention.

Figure 7:
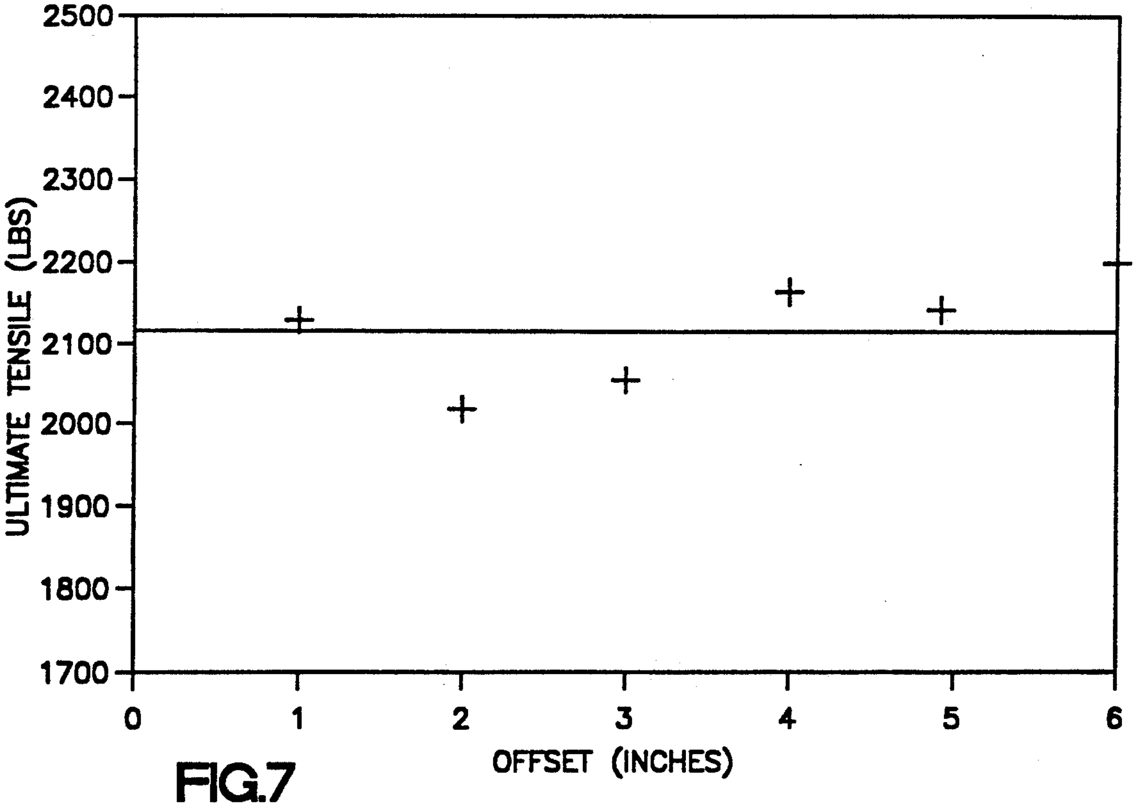
FIG. 7 is a graph showing the effect on ultimate tensile strength by the present invention.

While the present invention results in a significant increase in ultimate yield torque, there is no significant increase in the ultimate tensile strength of the coupling. FIG. 7 shows the results of tests, similar to those conducted and shown in FIG. 6, in which the ultimate tensile strength was measured for five door operator assemblies for each offset distance x from 1 inch to 6 inches. The door operator assemblies were of the same common commercial type as those used in the tests shown in FIG. 6. The average tensile strength for the five test samples at each offset distance is depicted in FIG. 7. As shown in FIG. 7, the ultimate tensile strength increased only about 3% from zero offset to an offset of 6 inches. Thus, the coupling assembly of the prior art which provided no offset may provide sufficient tensile strength, due to the presence of the splice plates 56, the interengaging portions of the screw coupling 42 and the sleeve 52. An expected result of increasing tensile strength is not achieved by the present invention. However, torque strength is increased without increasing tensile strength, and this result is unexpected.

Figure 5:
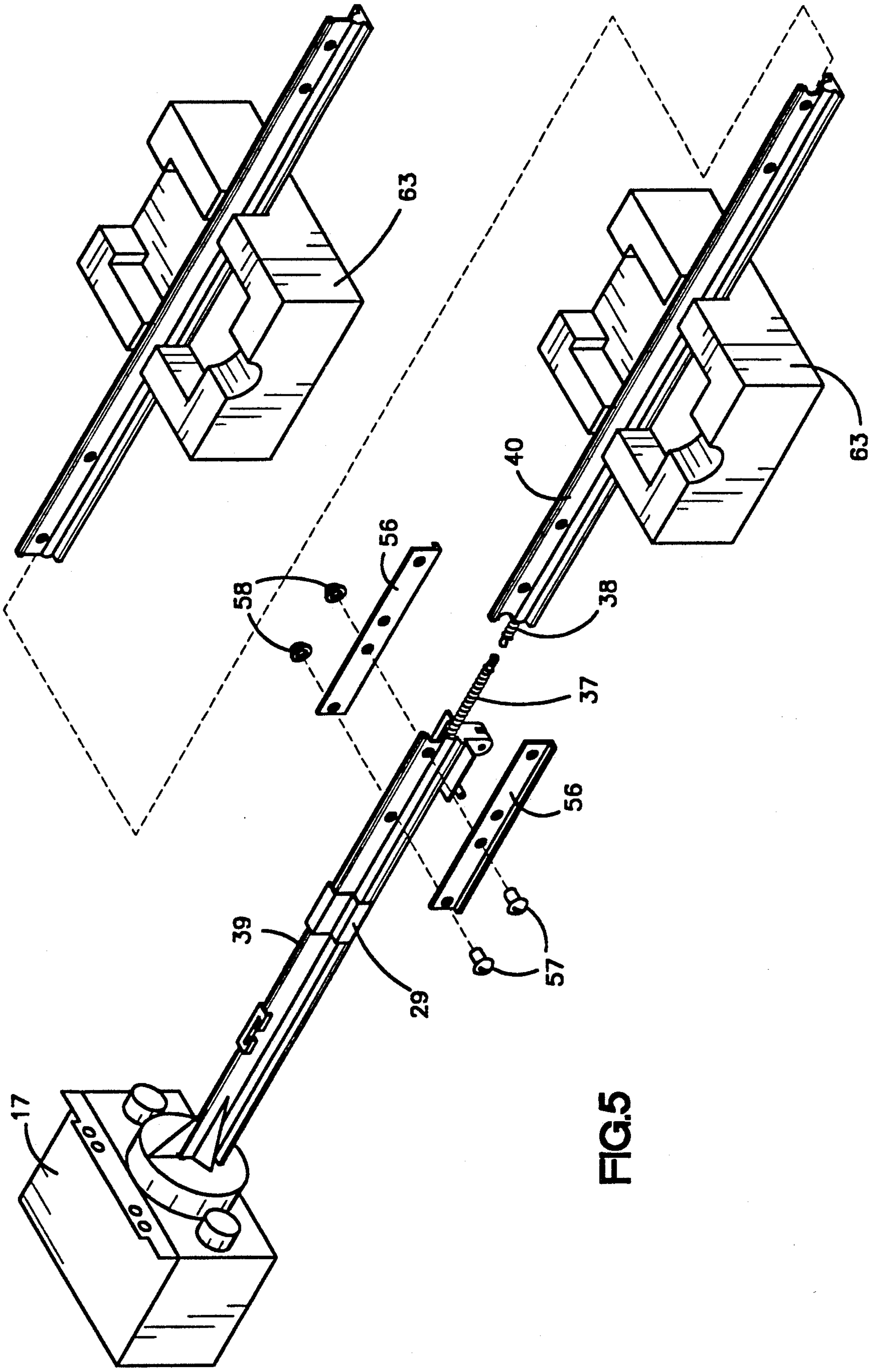
FIG. 5 is a perspective view of the door operator showing the assembly of the coupling assembly.

The assembly and operation of the door operator 10 of the present invention can be understood with reference to FIGS. 3, 4 and 5.

The door operator 10 is shipped in a collapsed condition with the two (or more) screw parts 37 and 38 disposed side by side each within the respective guide rail parts 39 and 40. One of the screw parts 37 or 38 may already be properly in working connection to the motor 17, as illustrated by screw part 37 shown in FIG. 5. As shipped, the one end of the screw part 37 opposite the motor 17 preferably extends outwardly from the respective part 39 of the guide rail by the desired offset distance, approximately as shown in FIG. 5, in accordance with this invention. Upon unpacking, the user or installer first positions the guide rail parts 39 and 40 on a flat surface, generally as shown in FIG. 5. Each of the screw parts 37 and 38 is preinstalled in the respective guide rail parts 39 and 40. The screw part 38 is capable of longitudinal sliding movement and positioning within the guide rail part 40 prior to interconnection. The screw part 38 in the guide rail part 40 slides longitudinally toward the screw part 37 to position the screw parts 37 and 38 in an abutting relationship for assembly together.

The proper alignment of the guide rail parts 39 and 40 may be aided by the use of one or more support fixtures or jigs 63. The support jigs 63 help to hold the guide rail parts 39 and 40 in proper alignment and also raise the second guide rail part 40 above the flat surface on which the assembly takes place to maintain the second guide rail part 40 in the same horizontal plane as the first guide rail part 39 which is elevated by reason of its attachment to the motor 17. Each of the support jigs 63 may be provided to the user or installer in the form of foam packing blocks which would also be configured to fit around the motor 17 when the door operator assembly is packaged. The support jigs 63 or packing blocks would be removed from around the motor 17 when the door operator assembly is unpackaged and would be positioned so as to support the guide rail parts 39 and 40 in proper alignment.

With the screw parts 37 and 38 in an abutting relationship, the screw coupling 42 is connected together as described in U.S. Pat. No. 4,352,585. The sleeve 52 is first slipped over the male shoulder 49 onto the reduced diameter portion 51. The two screw coupling parts 45 and 46 are then disposed side by side and axially parallel about as shown in FIG. 3. The guide rail parts 39 and 40 are moved to be coaxial to interengage the screw coupling 45 and 46. Next, the sleeve 52 slides to the right as viewed in FIG. 3, and the C clip 53 is transversely inserted over the reduced diameter portion 51. This prevents the sleeve 52 from moving to the left whereat it would not be covering the interengaged screw coupling parts 45 and 46. With the screw part 37 in operative connection with the motor 17, the guide rail part 40 slides to the right (as shown in FIG. 5) while the screw part 38 remains stationary until the guide rail part 40 abuts the guide rail part 39. The guide rail parts 39 and 40 are thus moved axially together, with the guide rail part 40 sliding over the screw 20. The splice plates 56 are next positioned in place by locating the circular protrusion 61 on each splice plate into the circular hole formed by the semicircular recesses 60 on the end of each guide rail part 39 and 40, and the splice plates 56 are bolted in place, using the bolts 57 and nuts 58 through the apertures 59. Additional screw parts and guide rail parts, if any, are then added to the assembly in the same manner. The door operator 10 may then be installed against the ceiling 12 and door header 13 in the usual manner, and connected to the door 14 to move it between the open and closed positions.

It is not possible to connect the screw coupling 42 so that the two screw parts 37 and 38 are connected incorrectly. A triple thread screw has been illustrated in the figures, and in such case it is quite important that the screw parts be connected together correctly so that they are not mismatched relative to the partial nut 28, which traverses the coupling for each door opening or closing movement. Because the screw coupling 42 is a hermaphroditic coupling, i.e., one which has partly male and partly female properties, it is impossible to connect the screw coupling in other than the correct manner. The coupling part interconnection also minimizes the possible cumulative tolerance errors as more fully described in U.S. Pat. No. 4,352,585.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way this is inconsistent with the extent to which the progress in the art has been advance by the invention.

What is claimed is:

1. In a garage door operator having a motor-driven rotatable screw at least partially within nonrotatable guide means, a means guided by the guide means and movable longitudinally therealong by engagement with the screw and connectable to open and close the garage door, the screw being in at least first and second screw parts, a screw coupling adapted to interconnect adjacent ends of the first and second screw parts, the guide means being in at least first and second guide parts, and a guide coupling adapted to interconnect adjacent ends of the first and second guide parts, the improvement comprising the screw coupling being longitudinally spaced from the guide coupling wherein the screw coupling is completely contained and supported for rotation within one of said first and second guide parts.

2. The improvement of claim 1, wherein the first screw part is substantially longer than the corresponding first guide part, and the first screw part extends a substantial distance into the second guide part.

3. The improvement of claim 1, wherein the first screw part is at least 10% longer than the corresponding first guide part.

4. The improvement of claim 1, wherein the screw coupling is longitudinally spaced at least two inches from the guide coupling.

5. The improvement of claim 1, wherein the screw coupling is longitudinally spaced at least approximately six inches from the guide coupling.

6. The improvement of claim 1, wherein the screw coupling comprises means for transmitting torque from the first screw part to the second screw part.

7. The improvement of claim 1, wherein the screw fits closely within a corresponding bore in the guide means.

8. The improvement of claim 1, wherein the screw parts are capable of longitudinal sliding movement and positioning within the guide parts prior to interconnection.

9. The improvement of claim 1, wherein the screw coupling has approximately the same external diameter as the screw parts to permit the screw coupling to fit within the guide means and to permit the means movable longitudinally along the guide means to be in continuous engagement with the screw.

10. In a garage door operator having a motor-driven screw at least partially within guide means, a means guided by the guide means and movable longitudinally therealong by engagement with the screw and connectable to open and close the garage door, the screw being in at least first and second screw parts, a screw coupling adapted to interconnect adjacent ends of the first and second screw parts, the guide means being in at least first and second guide parts, each of the guide parts corresponding to one of the screw parts, and a guide coupling adapted to interconnect adjacent ends of the first and second guide parts, the improvement comprising the first screw part being at least 10% longer than the corresponding first guide part, and the first screw part extending into the second guide part, wherein the screw coupling is longitudinally spaced from the guide coupling and the screw coupling is completely contained and supported for rotation within the second guide part.

11. A method of assembling a garage door operator having a motor-driven screw at least partially within guide means, the screw being in at least first and second screw parts, the guide means being in at least first and second guide parts, the first screw part located within the first guide part to form a first partial assembly, the second screw part located within the second guide part to form a second partial assembly, the method comprising the steps of:

positioning the second partial assembly in general coaxial alignment with the first partial assembly;

interconnecting adjacent ends of the first and second screw parts using a screw coupling;

sliding the screw coupling a substantial distance into the second guide part so that the screw coupling is completely contained within the second guide part; and interconnecting adjacent ends of the first and second guide parts using a guide coupling.

12. A method of assembling a garage door operator as in claim 11 wherein the second partial assembly is positioned in general coaxial alignment with the first partial assembly using one or more support jigs to elevate the second partial assembly and to hold the partial assemblies in an aligned position, and the adjacent ends of the first and second screw parts are interconnected while the screw parts are maintained in aligned position by the support jig.

13. A method of assembling a door operator as in claim 12, comprising the additional step of unpacking the motor and the partial assemblies from packing material before positioning the second partial assembly in general coaxial alignment with the first partial assembly, and using part of the packing material for the support jig.

14. A method of assembling a garage door operator having a motor-driven screw at least partially within guide means, the screw being in at least first and second screw parts, the guide means being in at least first and second guide parts, the first screw part located within the first guide part to form a first partial assembly, the second screw part located within the second guide part to form a second partial assembly, the first partial assembly being connected to a motor, the method comprising the steps of:

placing the partial assemblies on a flat surface;

positioning the second partial assembly in general coaxial alignment with the first partial assembly using one or more support jigs to elevate the second partial assembly above the flat surface and to hold the partial assemblies in an aligned position;

interconnecting adjacent ends of the first and second screw parts using a screw coupling while the screw parts are maintained in aligned position by the support jig;

interconnecting adjacent ends of the first and second guide parts using a guide coupling while the guide parts are maintained in aligned position by the support jig.

15. A method of assembling a door operator as in claim 14, comprising the additional step of unpacking the motor and the partial assemblies from packing material before placing the partial assemblies on a flat surface, and using a portion of the packing material for the support jig.

16. A method of assembling a door operator as in claim 14, comprising the additional step of sliding the screw coupling a substantial distance into the second guide part so that the screw coupling is completely contained within the second guide part after interconnecting adjacent ends of the first and second screw parts using the screw coupling and before interconnecting adjacent ends of the first and second guide parts using the guide coupling.

* * * * *